(12) United States Patent
Lee

(10) Patent No.: US 6,995,857 B2
(45) Date of Patent: Feb. 7, 2006

(54) SYSTEM AND METHOD FOR ROUTING SERVICE REQUESTS FROM A PAIRED DIGITAL CAMERA AND TRANSCEIVER MODULE

(75) Inventor: Steven K. Lee, Edina, MN (US)

(73) Assignee: Vpr Matrix, Inc., Richfield, MN (US)

( * ) Notice: Subject to any disclaimer, the term of this patent is extended or adjusted under 35 U.S.C. 154(b) by 0 days.

(21) Appl. No.: 10/895,805

(22) Filed: Jul. 21, 2004

(65) Prior Publication Data

US 2005/0162687 A1    Jul. 28, 2005

Related U.S. Application Data

(60) Provisional application No. 60/538,729, filed on Jan. 23, 2004.

(51) Int. Cl.
*G06F 15/00* (2006.01)
*G06F 13/00* (2006.01)
*G06F 3/12* (2006.01)

(52) U.S. Cl. .................................. 358/1.15; 348/207.1
(58) Field of Classification Search .............. 358/1.15; 348/207.1, 207.2, 211.3
See application file for complete search history.

(56) References Cited

U.S. PATENT DOCUMENTS

| | | | |
|---|---|---|---|
| 6,573,927 B2 | 6/2003 | Parulski et al. | |
| 6,591,098 B1 * | 7/2003 | Shieh et al. | 455/419 |
| 6,636,259 B1 | 10/2003 | Anderson et al. | |
| 6,701,845 B2 | 3/2004 | Ohmura | |
| 6,750,902 B1 * | 6/2004 | Steinberg et al. | 348/211.3 |
| 2001/0012066 A1 | 8/2001 | Parulski et al. | |
| 2001/0019359 A1 | 9/2001 | Parulski et al. | |
| 2001/0028474 A1 | 10/2001 | Parulski et al. | |
| 2001/0052942 A1 | 12/2001 | MacCollum et al. | |
| 2002/0063889 A1 | 5/2002 | Takemoto et al. | |
| 2002/0071035 A1 | 6/2002 | Sobol | |
| 2002/0108038 A1 * | 8/2002 | Tanaka et al. | 713/169 |
| 2002/0113879 A1 | 8/2002 | Battle et al. | |

(Continued)

FOREIGN PATENT DOCUMENTS

EP        1075138 A2        2/2001

(Continued)

OTHER PUBLICATIONS

Imaging-Resource.com, Ricoh RDC-i700 Image Capturing Device, http://www.imaging-resource.com/PRODS/I700/I70A.htm, Jul. 21, 2004.

(Continued)

*Primary Examiner*—Edward Coles
*Assistant Examiner*—Alan Rahimi
(74) *Attorney, Agent, or Firm*—Beck & Tysver, P.L.L.C.

(57) ABSTRACT

A system and method for obtaining prints or other services from a digital camera uses a camera and a transceiver module, each having unique identifiers that are stored in a database stored on a remote print routing server. To obtain the service, the user couples the camera to the transceiver module and requests an image service, such as by pressing a button. The transceiver module sends image files and a request for prints to the routing server. The routing server confirms that the request is authorized by querying its database to determine if the camera identifier is authorized for use with the transceiver module. Provided the service request is authorized, the routing server sends the image files to a print center. The service request is coupled with shipping and billing information, such that the print center is able to ship prints to the shipping address and bill the appropriate account.

17 Claims, 3 Drawing Sheets

U.S. PATENT DOCUMENTS

| | | | |
|---|---|---|---|
| 2002/0141586 A1 * | 10/2002 | Margalit et al. | 380/270 |
| 2003/0025808 A1 | 2/2003 | Parulski et al. | |
| 2003/0053124 A1 * | 3/2003 | Iijima et al. | 358/1.15 |
| 2003/0065531 A1 | 4/2003 | Satomi et al. | |
| 2003/0065585 A1 | 4/2003 | Satomi et al. | |
| 2003/0181200 A1 * | 9/2003 | Iida | 455/414.1 |
| 2003/0217057 A1 * | 11/2003 | Kuroiwa et al. | 707/7 |
| 2004/0001226 A1 | 1/2004 | Ohtuka | |
| 2004/0041923 A1 | 3/2004 | Iida | |
| 2004/0051787 A1 * | 3/2004 | Mutsuro et al. | 348/211.99 |

FOREIGN PATENT DOCUMENTS

| | | |
|---|---|---|
| EP | 1158767 A1 | 11/2001 |
| JP | 2003046915 A | 2/2003 |
| JP | 2003264737 A | 9/2003 |
| WO | WO 00/31966 | 6/2000 |
| WO | WO 02/28086 A1 | 4/2002 |

OTHER PUBLICATIONS

COmputer.howstuffworks.com, How Wireless Internet Works, http://www.computer.howstuffworks.com/wireless-internet.htm, Jul. 21, 2004.

Dotphoto.com, RDC-I700 Internet Ready Digital Camera, http://www.dotphotoinfo.com/Camera_Support/Ricoh%20i700%20Camera%20at%20dotPhoto.htm, Jan. 20, 2004.

* cited by examiner

SYSTEM AND METHOD FOR ROUTING SERVICE REQUESTS FROM A PAIRED DIGITAL CAMERA AND TRANSCEIVER MODULE

CLAIM OF BENEFIT TO PROVISIONAL APPLICATION

This application claims the benefit of U.S. Provisional Application No. 60/538,729, filed Jan. 23, 2004.

FIELD OF THE INVENTION

The present invention relates generally to a system for obtaining prints from a digital camera in a simple, user-friendly manner that safeguards a user's payment information. More specifically, the present invention relates to a base transceiver module and a paired digital camera for wireless routing of images to obtain prints shipped to a designated address or to obtain other digital image services.

BACKGROUND OF THE INVENTION

Digital cameras have captured a significant share of the market for both consumer and professional cameras. While photos or images in digital form are convenient for many uses, users oftentimes desire to obtain prints of their captured images. There are several known ways to obtain a paper print of a digital photo. The most common technique is to print the photographs on a local color printer. To accomplish this, the user downloads the photos from the camera to a personal computer. Using software on the computer, the user can then select photographs for printing, and send them to their printer. Although the cost of color printers continues to decrease, users have been frustrated with this technique for creating prints of digital photographs for a number of reasons. First, the ink cartridges used by home color printers frequently run out of ink or dry out because of non-use. Purchasing and replacing the ink cartridges remains expensive and time consuming. In addition, the expense of buying the quality paper necessary for good photo prints means that there is little cost savings in printing photographs on home equipment.

To avoid the hassle of home printing, a user may email photographs from their personal computer to a photo printing service, such as Snapfish.com. This is disadvantageous because a computer is required and thus the locations from which the user may accomplish this task are limited. Further, this process has many steps and is cumbersome and time-consuming. Alternatively, the media on which the digital camera stores images, such as on a compact flash memory card, can be transported to a photo lab for print processing. It may, however, be inconvenient for a user to travel to a photo lab. Furthermore, the user's preferred print lab may be remote from the user's location, such as when the user is traveling. In addition, flash memory cards and the like are small and may easily be lost or misplaced. What is needed is a simple way to submit images directly from a digital camera to a preferred photo lab for the creation and delivery of prints. Prior art techniques that accomplish this suffer in that wireless transceivers are embedded in the camera, meaning that the camera becomes bulky and that the transceiver quickly drains battery resources on the camera. Furthermore, a theft of one of these cameras may allow a thief access to a user's payment mechanism.

SUMMARY OF THE INVENTION

The present invention provides a simple, user-friendly way for a digital camera user to obtain prints of captured images delivered to a designated address. Alternatively, the present invention could be used to route service requests for digital images such as archival services, book creation, on-line photo albums and the like. The user simply connects their camera to a base or "transceiver module" and then indicates their desire to obtain prints from a print center such as by pushing a single button on their camera or the transceiver module or by selecting a command on the user interface of the camera.

A print routing server hosts a database having a table to store unique camera identifiers and a table storing unique transceiver module identifiers. Stored in association with the camera identifiers are a name and shipping address. In one embodiment, a list of available services is also stored in association with the camera identifier. The transceiver module table tracks a username and password in association with the unique module identifier. The transceiver module table further includes billing information, such as a credit card number and expiration date, and a list of services available for that transceiver module. One or more camera identifiers are associated with each transceiver identifier in the transceiver database.

To obtain prints, a user connects a camera to a transceiver module and transmits desired images to the print routing server. The transceiver module appends to this transmission the identifiers for the camera and the transceiver module. Upon receiving the print request transmission, the print routing server checks its databases to determine whether the camera identifier is associated with the transceiver module in the transceiver module table. If so, the digital image files are forwarded to a print center along with a shipping address and billing information. The print center generates the prints, ships them to the shipping address, and forwards billing information as directed. The user receives prints at their previously selected address and is billed for the prints according to payment information previously provided.

BRIEF DESCRIPTION OF THE DRAWINGS

An exemplary version of a system and method for routing digital prints is shown in the figures wherein like reference numerals refer to equivalent structure throughout.

DETAILED DESCRIPTION OF PREFERRED EMBODIMENT(S)

Figure 1:
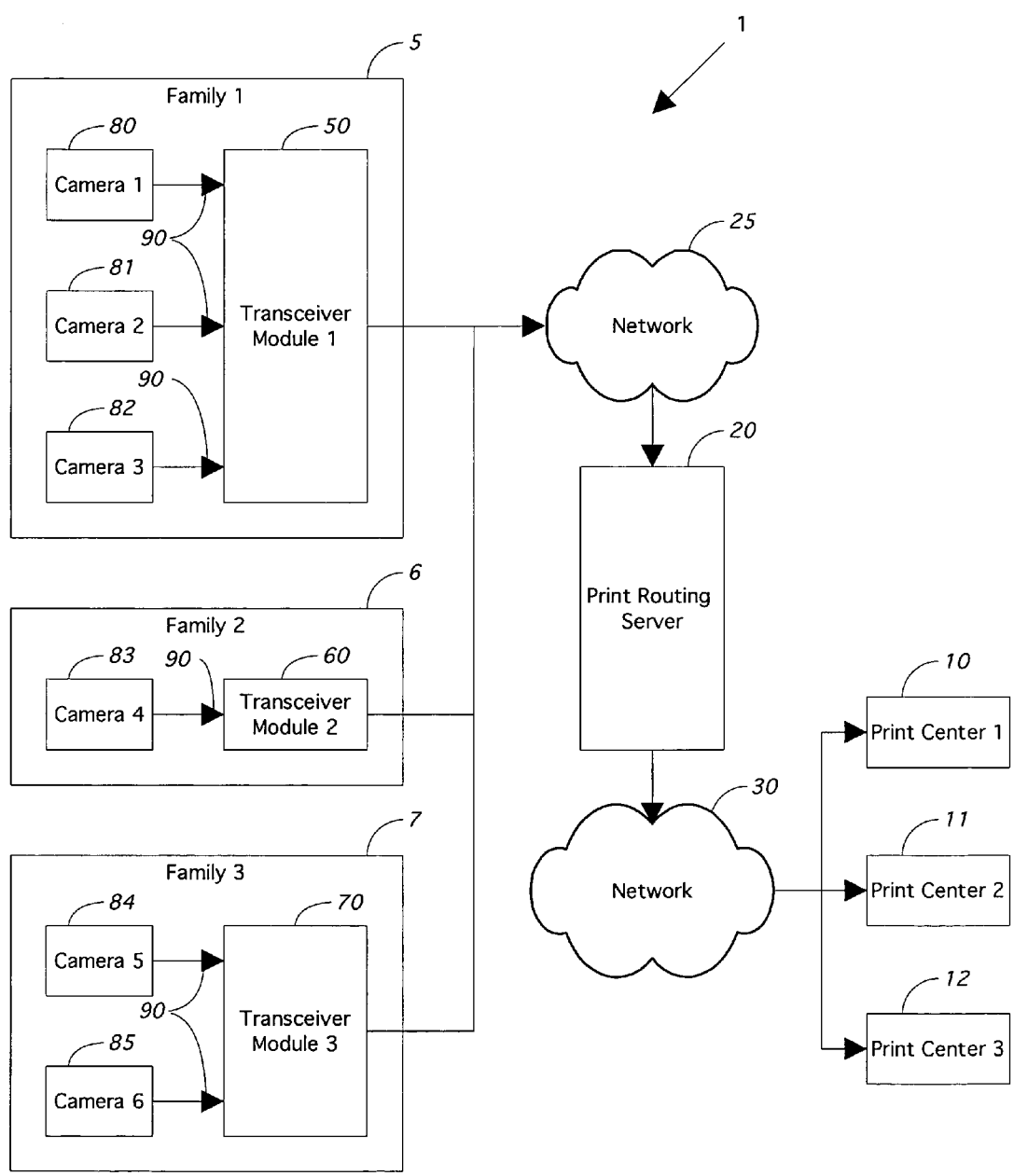
FIG. 1 is a schematic illustration of the present invention technique for routing prints from digital cameras to print centers.

FIG. 1 schematically illustrates a system 1 for obtaining digital image services from a digital camera in a simple, user-friendly manner that provides for security to safeguard a user's payment information. The possible digital image services that could be provided through the present invention include the delivery of physical prints to a destination address, the creation of prints available for pickup, the creation of a physical book from the images, the making of archival copies made for later on-line download, the creation of on-line photo albums, and the like. For simplicity, the description below is presented in the context of a request for physical prints to be delivered to a destination address, although the invention should not be considered so limited.

The system 1 supports one or more camera families and yields prints or other digital image services from one or more print centers. Three representative camera families 5, 6, 7 and three representative print centers 10, 11, 12 are depicted in FIG. 1. It will be understood that the system 1 may support any number of camera families and any number of print centers.

Coordinating the routing of the digital images from the camera families 5, 6, 7 to the print centers 10, 11, 12 is a print routing server 20. The camera families 5, 6, 7 communicate with the print routing server 20 via a network 25, such as the Internet. The print routing server 20 also communicates to print centers 10, 11, 12 via a network 30, such as the Internet.

Each camera family 5, 6, 7 includes a single base or transceiver module 50, 60, 70, respectively, and one or more associated digital cameras 80, 81, 82, 83, 84, 85. More specifically, camera family 5 includes three cameras 80, 81, 82 which are affiliated, in a manner that will be described below, with transceiver module 50; camera family 6 includes one camera 83 which is affiliated with transceiver module 60; camera family 7 includes two cameras 84, 85 which are affiliated with transceiver module 70. A camera family can contain any number of cameras, and these depicted families 5, 6, 7 are merely examples. The cameras 80–85 within a family 5–7 communicate with their associated transceiver module via a communicator coupling 90, such as a physical USB or USB2 coupling. This communication coupling allows data and commands to be shared between the cameras 80–85 and the transceiver modules 50–70. Couplings other than USB connections are possible and within the scope of the present invention, so long as the coupling includes an ability to share data and commands between the cameras 80–85 and the transceiver modules 50–70.

Each camera 80–85 is assigned a unique identifier, such as a serial number, that is stored in built-in memory on the camera. Each transceiver module 50, 60, 70 similarly is assigned a unique identifier, such as a serial number, that is stored in built-in memory on the transceiver. Each camera 80–85 is equipped to capture images and store image files in memory.

Each transceiver module 50, 60 70 is equipped with hardware and software that allows the transfer of image files, commands, and other data to the print routing server 20 over the network 25. For example, to provide wireless transfer of data from the transceiver module 50, 60, 70 to the server 20, a transceiver module 50, 60, 70 may contain a wireless transceiver defined by one of the IEEE 802.11 standards, such as 802.11a, 802.11b, or 802.11g. This transceiver can then communicate to a local transceiver (not shown in FIG. 1) that may be physically connected to the network 25.

Figure 2:
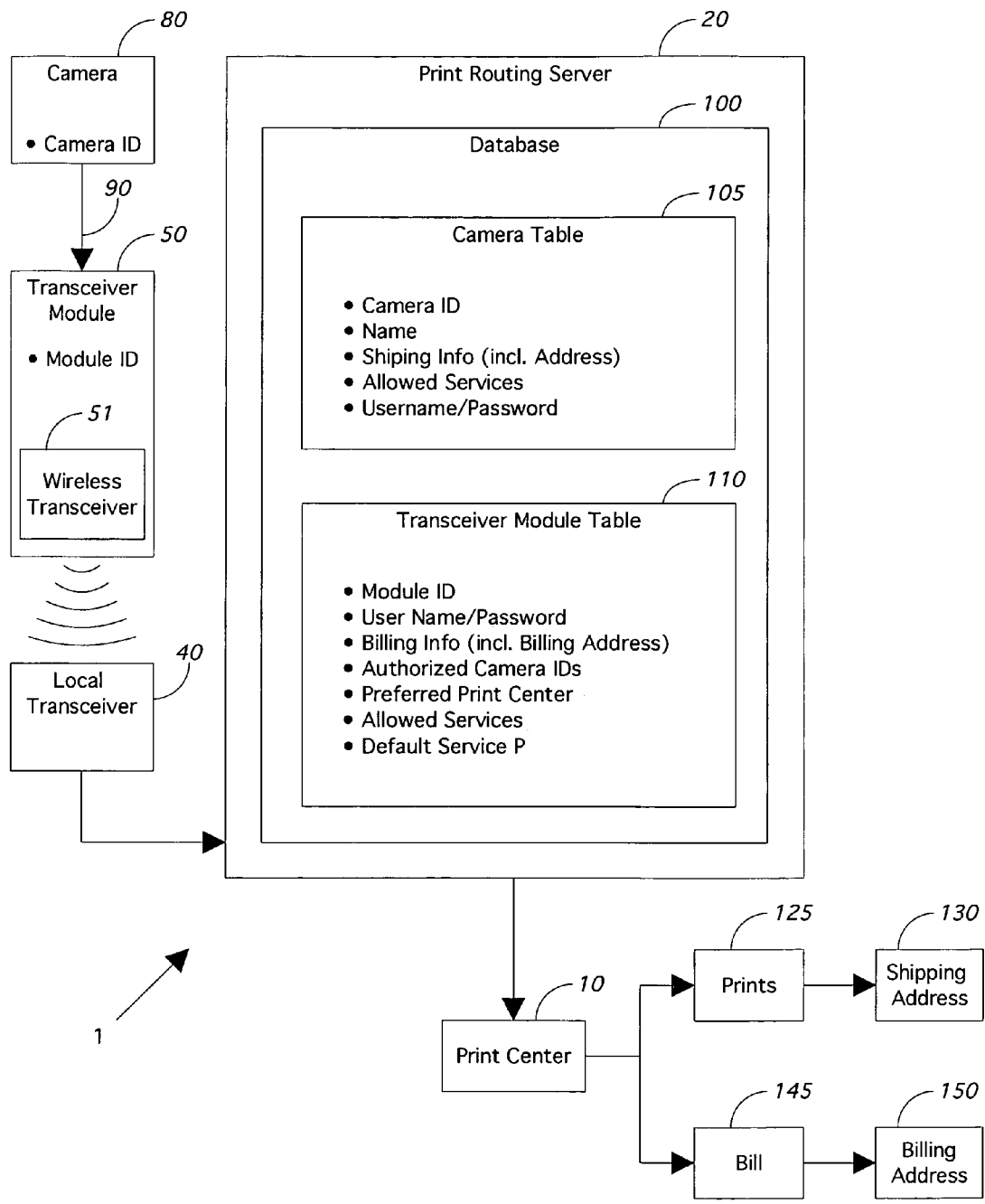
FIG. 2 is a schematic illustration of the technique of FIG. 1 including further details on the print routing server of FIG. 1.

The system 1 is further illustrated in FIG. 2. Camera 80 contains a camera ID, and is in communication with the transceiver module 50. This communication could take a variety of forms, but preferably is made over a physical, wired connection 90. The transceiver module 50 contains a transceiver module ID and communicates image data received from the camera 80 to the print routing server 20. In the preferred embodiment, the transceiver module 50 contains a wireless transceiver 51 that communicates with local transceiver 40. The local transceiver does not need to be specially programmed for the present invention, although it may be possible to do so. The primary purpose of the local transceiver 40 is to accept wireless communications received from the transceiver module 50 and communicate them to the print routing server 20, such as through a wired Internet connection. In the preferred embodiment, the transceiver module 40 contains its own power supply such that the battery power in camera 80 is not utilized to operate the wireless transceiver 51.

In addition, it would be within the scope of the present invention for the transceiver module 50 to perform additional functions for the camera 80, such as to serve as a stable base (like a tripod) for stabilizing the camera during image acquisition. The transceiver module 50 may allow the camera to utilize battery power or other power source associated with the module 50 to power the camera 80 or to recharge batteries found within the camera 80. For instance, the transceiver module 50 may take the form of a traditional recharging base for the camera 80, where the transceiver module 50 or associated circuitry transforms AC power into the DC power needed for the camera 80. The transceiver module 50 may also contain storage compartments for storing batteries, memory cards, and the like for the camera 80. Furthermore, the transceiver module 50 may contain internal memory that can be used to store image data from the camera 80. This internal memory might take the form of RAM, flash memory, a traditional memory card, a writable optical drive, or an internal or external hard disk.

The print routing server 20 hosts a database 100. The database 100 includes a camera table 105 and a base station or transceiver module table 110. There is one record in the camera table 105 for each camera 80 serviced by the print routing server 20, and one record in the transceiver module table 110 for each serviced transceiver module 50. Stored in each record in camera table 105 is a camera identifier, a name, and shipping information, such as a physical shipping address. In some instances, services available to that camera 80 may also be stored in each record of the camera table 105. The information to populate the camera table 105 will be provided by the camera user or owner at the point of sale or later through other means, such as an online registration process.

Stored in each record of the transceiver module table 110 is a module identifier, a user name, a password, billing information (such as a credit card information and/or a billing address), and an identification of a preferred print center. In addition, the records in the transceiver module in table 110 are associated with one or more camera identifiers. It is this association that groups one or more cameras 80–85 together with a transceiver module 50–70 to form a camera family 5, 6, 7. In some instances, services available to the transceiver module 50 may be stored in the transceiver module table 110. The information to populate the transceiver module table 110 is provided by the owner of the base transceiver module 50 at the point of sale or later via an online registration process.

The user name and password are used to prevent unauthorized modification of the information in the transceiver module table 110 and in the camera table 105. Where the user name and password are stored only in connection with the transceiver module table 110, any user knowing this information can update this record 110 and the records in the camera table 105 relating to authorized cameras. Alternatively, the user name and password fields could be included in the camera table 105 as well. Adding a camera ID to the list of authorized cameras in a record of the transceiver module table 110 requires at a minimum the user name and password found in that record of table 110. This prevents an unauthorized user of the transceiver module 50 to allow use of the module 50 (and its associated billing information) with a new camera 80. In addition, by associating a username and password with each camera 80 in table 105, one can prevent any camera 80 from being authorized with a new transceiver module 50 without knowledge of the camera's password.

In operation, a user will capture images with a digital camera 80. When the user has images that he or she would like to have printed, the user couples the camera 80 to an associated transceiver module 50 and presses the button or makes a menu selection to obtain prints. The transceiver module 50 connects to the print routing server 20 via the local transceiver 40 and transmits to the print routing server 20 the images to be printed, the camera identifier and the module identifier. This transmission can optionally include a service request (such as a request for two 4×6 physical prints for each image transmitted). Alternatively, no service request is explicitly included in the transmission, meaning the image data will processed according to a default service request pre-established by either the camera user or the print service provider.

Upon receipt of this transmission, the print routing server 20 will query database 110 to find a record for the transaction module identifier and determines whether the transmitted camera identifier matches an authorized camera identifier as indicated by the record in table 110. If a match is made, the print request is authorized and the server 20 sends the image files to the preferred print center 10 along with other details, such as the service request, and shipping and billing information. Again the service request could be explicitly defined in the transmission from the transceiver module 50, or could be based on defaults defined by the user in the database 110. Alternatively, no service request could be sent to the print center 10, allowing the print center 10 to handle the image data according to its own default service procedures. Once the image data is successfully sent to the print center 10, a confirmation of successful transmission can be sent back to the camera 80 so that the user will know the print request has been successful.

The print center 10 will then make prints 125 of the images based upon these service instructions. The print center 10 then forwards the resulting prints 125 to the shipping destination or address 130 and sends a bill 145 to the billing destination or address 150. The user receives the prints 125 at the shipping address 130 or can instruct the print center 10 to hold the prints for later pickup. The user will receive a bill 145 at the billing address 150 for the prints. It would also be possible to have the billing information in the transceiver module table 110 to include credit card information, thereby allowing the print center to directly charge the transaction to a credit card account.

Figure 3:
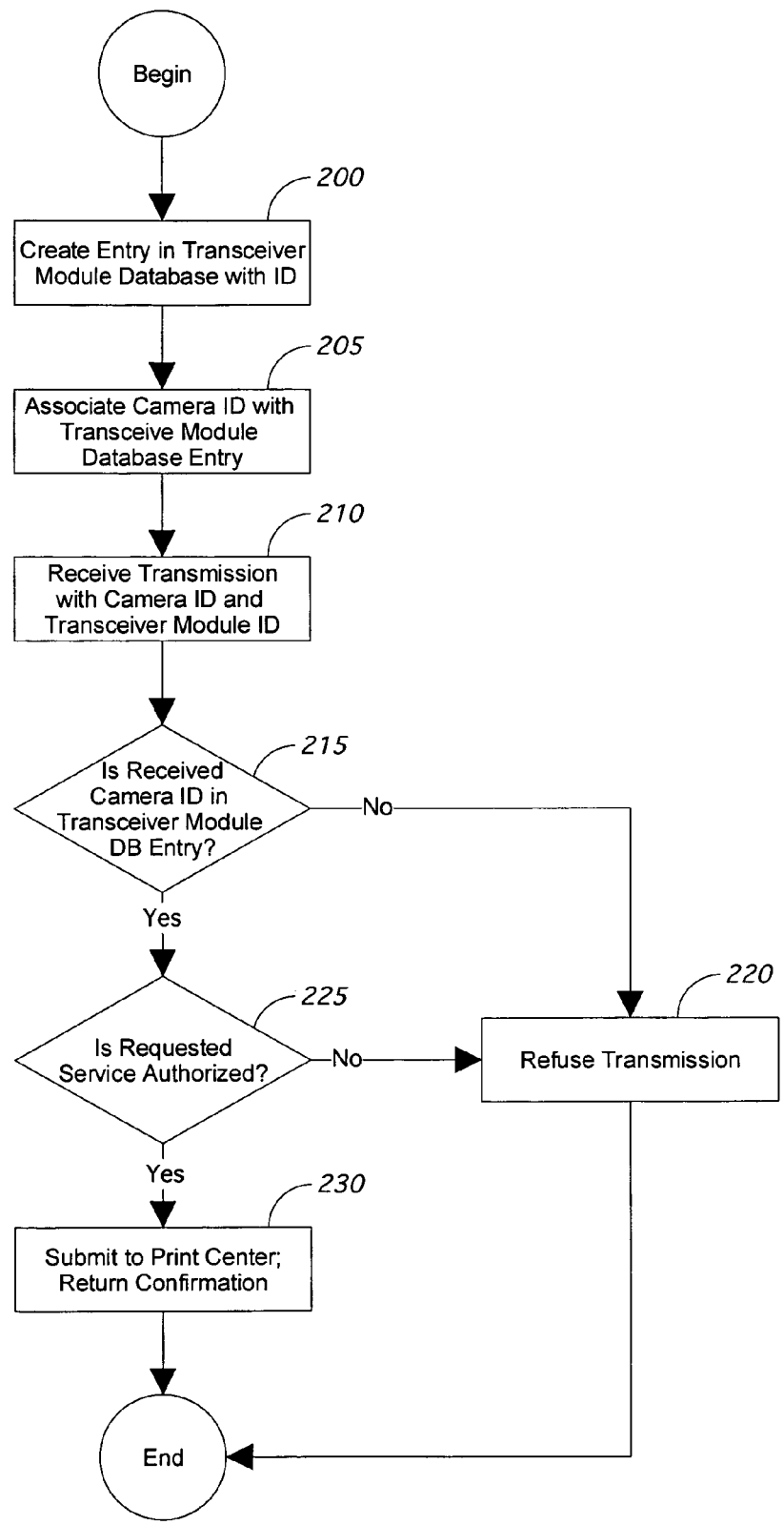
FIG. 3 is a flow chart depicting a method of verifying that a request for prints in authorized according to the present invention.

This process, to the extent it involves the print routing server 20, is shown in the flow chart of FIG. 3. At the point of sale to the consumer or through a later registration process, the transceiver module identifier is stored in the transceiver module table 110 of the database 100 (step 200). Similarly, at point of sale or through a later registration process, one or more camera identifiers are stored (step 205) in the camera table 105 and associated with a transceiver module 50 by being added to the authorized camera fields of the appropriate record of the transceiver module table 110. When a user sends a request for prints, the server 20 receives the transmission from the transceiver module 50 (step 210). The transmission includes the camera identifier and the transceiver module identifier, along with image data.

In step 215, the server compares the camera identifier in the transmission to the camera identifier(s) listed in the database 100 in association with the given transceiver module identifier. If the camera identifier does not match any of the camera identifiers association with the transceiver module identifier, the prints are not authorized and the print request found in the transmission is refused (step 220).

If a match is made, the print server then determines in step 225 whether the transmission includes a service request that is authorized in the database 100. This is accomplished by comparing the service request in the transmission to the available service requests in the appropriate records of the camera table 105 or the transceiver module table 110. In one embodiment, both tables 105, 110 must indicate that the requested service is authorized. Alternatively, step 225 may be skipped, thereby authorizing all requested services. If step 225 indicates that the requested service is not authorized, the transmission is refused in step 220. Otherwise, the print routing server 20 will send the image file(s) and service request found in the transmission, along with the shipping and billing information from the database 100 to the selected print center 10 (step 230). The print center 10 can be selected through the database 100, or through information found in the transmission itself. Step 230 also involves sending a confirmation notice back to the camera 80 to inform the user of the successful handling of the print request. Alternatively, this confirmation notice could be triggered only after the print request is successfully received by the print center 10.

By requiring that the camera identifier match a previously established association with a transceiver module identifier, the system 1 prevents prints from being ordered where the user does not have a matching camera 80 and transceiver module 50. This precludes unauthorized attempts to obtain prints. Thus, a user must have both the camera 80 and the proper transceiver module 50 to order prints. If a camera 80 is stolen without the transceiver module 50, the thief cannot obtain prints simply by attaching the camera 80 to another transceiver module 50, and thus the camera owner will not be charged for unauthorized prints. Similarly, if a transceiver module 80 is stolen, the thief cannot obtain prints by attaching a different camera 50 to the transceiver module 80.

The user name and password provide an additional layer of security since a thief cannot access sensitive account information, such as address or credit card information. With the user name and password, the legal, authorized user can access their account information to modify their billing or shipping information.

The system provides convenient ordering of prints from anywhere, provided the user has both their camera 80 and a paired transceiver module 50. Local transceivers 40 can be purchased for use within a user's home. Alternatively, the user can find a "hot spot" where a local transceiver 40 has been made available for public use, such as in a coffee shop, a hotel, or an airport. Regardless of the location where the user accesses the system 1, the user can be assured that their preferred print center 10–12 will receive their image, create prints according to their instructions, deliver the prints to their shipping address, and properly bill their account.

The operator of the print routing server 20 can receive income for its service in a variety of ways. For instance, the operator can sign up a plurality of print centers 10–12 to service clients of the print routing server 20, and receive a fixed fee or a percentage of all business sent to the print centers 10–12 through the print routing server 20. Alternatively, the operator can charge the fee to users of the system who send image data to the print centers 10–12.

Although an illustrative version of the device is shown, it should be clear that many modifications to the device might be made without departing from the scope of the invention. For instance, although the above description and figures depict the data in database 100 as a plurality of data tables 105, 110, any known technique for maintaining data in a database could be used, such as by defining one or more data objects. Consequently, the scope of the present invention should be defined only by the following claims.

I claim:

1. A method for obtaining digital services from a digital camera, comprising the steps of:
   a) associating a unique camera identifier with a camera;
   b) associating a unique transceiver identifier with a transceiver module;
   c) communicating image data from the camera to the transceiver module;
   d) transmitting the image data, the transceiver identifier, and the camera identifier from the transceiver module to an image services routing server;
   e) ensuring by consulting a database that the camera associated with the camera identifier is authorized to transmit image data through the transceiver module associated with the transceiver identifier, wherein the database contains a transceiver data construct associated with a plurality of transceiver modules from which information about a particular transceiver module can be obtained utilizing the transceiver identifier, and further wherein the transceiver data construct includes the ability to associate a plurality of camera identifiers with each transceiver identifier; and
   f) fulfilling a service request associated with the image data.

2. The method of claim 1, wherein the transceiver data construct is chosen from the set comprising a database table and a database object.

3. The method of claim 1, wherein the database contains a camera data construct associated with a plurality of cameras.

4. The method of claim 3, wherein the transceiver data construct contains billing information.

5. The method of claim 4, wherein the camera data construct contains delivery information.

6. The method of claim 5, further comprising:
   g) submitting the image data from the image services routing server to a print center for creating at least one physical print from the image data.

7. The method of claim 6, wherein the print center is chosen from a plurality of possible print centers based upon information in the database.

8. The method of claim 6, wherein the print center is chosen from a plurality of possible print center based upon information transmitted from the transceiver module with the image data.

9. The method of claim 6, wherein the print center creates the at least one physical print based upon a service request submitted to the print center from the print routing server.

10. The method of claim 9, wherein the service request is transmitted to the print routing server from the transceiver module.

11. The method of claim 9, wherein the service request is based upon a default service request found in the database.

12. The method of claim 1, further comprising:
   g) submitting the image data from the image services routing server to a services center for providing a service based upon the image data, the service being selected from the set of the creation of a physical print, the creation of a physical book from the image data, the storing of an archival copy of the image data for later retrieval, and the creation of an on-line image album.

13. A camera system for routing digital images to obtain image based services, comprising:
   a) a camera having a unique identifier stored electronically therein and memory for storing image data;
   b) a transceiver module having a unique identifier stored electronically therein, said transceiver module being removably coupled to said camera to receive the image data from the camera;
   c) a remote routing server in data communication with the transceiver module for receiving the image data from a plurality of cameras and transceiver modules, the remote routing server having a database storing the camera identifier in association with the transceiver module identifier, the database having a data construct for each of the plurality of cameras and each of the plurality of transceiver modules, wherein the data constructs for at least one of the plurality of transceiver modules associates a plurality of cameras as authorized cameras for the at least one transceiver modules.

14. The camera system of claim 13, wherein the transceiver module has a wireless local area network transceiver.

15. The camera system of claim 14, wherein the wireless local area network transceiver is defined by one of the IEEE 802.11 standards.

16. The camera system of claim 15, further comprising a local transceiver receiving wireless communications from the transceiver module and forwarding the communications to the remote routing server.

17. The camera system of claim 13, wherein the routing server contains intelligence that rejects image data received from the camera and the transceiver module if the camera is not an authorized camera for the transceiver module.

* * * * *